US011290325B1

United States Patent
Kaluza et al.

(10) Patent No.: US 11,290,325 B1
(45) Date of Patent: Mar. 29, 2022

(54) SYSTEM AND METHOD FOR CHANGE RECONCILIATION IN INFORMATION TECHNOLOGY SYSTEMS

(71) Applicant: E.S.I. SOFTWARE LTD., Givat Shmuel (IL)

(72) Inventors: Bostjan Kaluza, Ljubljana (SI); Eyal Oz, Petah Tikva (IL); Michael Noam, Rosh Ha Ayin (IL); Alexander Sasha Gilenson, Givatayim (IL)

(73) Assignee: E.S.I. SOFTWARE LTD, Givat Shmuel (IL)

( * ) Notice: Subject to any disclaimer, the term of this patent is extended or adjusted under 35 U.S.C. 154(b) by 0 days.

(21) Appl. No.: 17/114,516

(22) Filed: Dec. 8, 2020

(51) Int. Cl.
*H04L 12/24* (2006.01)
*H04L 41/0816* (2022.01)
*H04L 41/0893* (2022.01)
*H04L 41/28* (2022.01)
*H04L 41/0866* (2022.01)
*H04L 41/0859* (2022.01)
*H04L 41/08* (2022.01)

(52) U.S. Cl.
CPC ...... *H04L 41/0816* (2013.01); *H04L 41/0859* (2013.01); *H04L 41/0866* (2013.01); *H04L 41/0886* (2013.01); *H04L 41/0893* (2013.01); *H04L 41/28* (2013.01)

(58) Field of Classification Search
CPC . H04L 41/0816; H04L 41/0893; H04L 41/28; H04L 41/0866; H04L 41/0886; H04L 41/0859
See application file for complete search history.

(56) References Cited

U.S. PATENT DOCUMENTS

| 7,024,548 | B1* | 4/2006 | O'Toole, Jr. | H04L 41/085 713/1 |
| 7,853,675 | B2* | 12/2010 | Cannon | H04L 41/0813 709/222 |
| 8,176,158 | B2* | 5/2012 | DiFalco | H04L 63/20 709/223 |
| 9,111,235 | B2* | 8/2015 | Sabharwal | G06Q 10/00 |
| 9,191,380 | B2* | 11/2015 | Anderson | H04L 9/3213 |
| 10,205,738 | B2* | 2/2019 | Subramanya | H04L 63/1425 |
| 2016/0043919 | A1* | 2/2016 | Connelly | H04L 41/28 709/220 |

(Continued)

*Primary Examiner* — Patrice L Winder
(74) *Attorney, Agent, or Firm* — Soroker Agmon Nordman

(57) ABSTRACT

A method of change reconciliation, including: detecting changes in configuration parameters collected from stations of a system and collecting or generating change request records for the detected changes, identifying unauthorized changes and authorized changes based on given rules, for a potentially authorized change that is not clearly authorized or unauthorized, identifying a context for the change request records, including: a) identifying authorized change implementers; b) identifying a scope of the content that is to be changed; c) identifying a time window when the change is allowed to be performed; identifying a context for the actual change, including: a) identifying a change implementer; b) identifying a scope of the content that was changed; c) identifying a time window when the change was performed; comparing the context of the change request with the context of the actual change; determining an authorization score responsive to said comparing; outputting the change authorization score.

20 Claims, 11 Drawing Sheets

Reconciliation output categories

(56) References Cited

U.S. PATENT DOCUMENTS

2019/0342338 A1* 11/2019 Anandam ............. H04L 63/101
2021/0135940 A1* 5/2021 Van Der Hoeven ......................... H04L 41/085

* cited by examiner

Input to ACISE when change request records are available.

Method for identifying affected configuration items (scope 620)

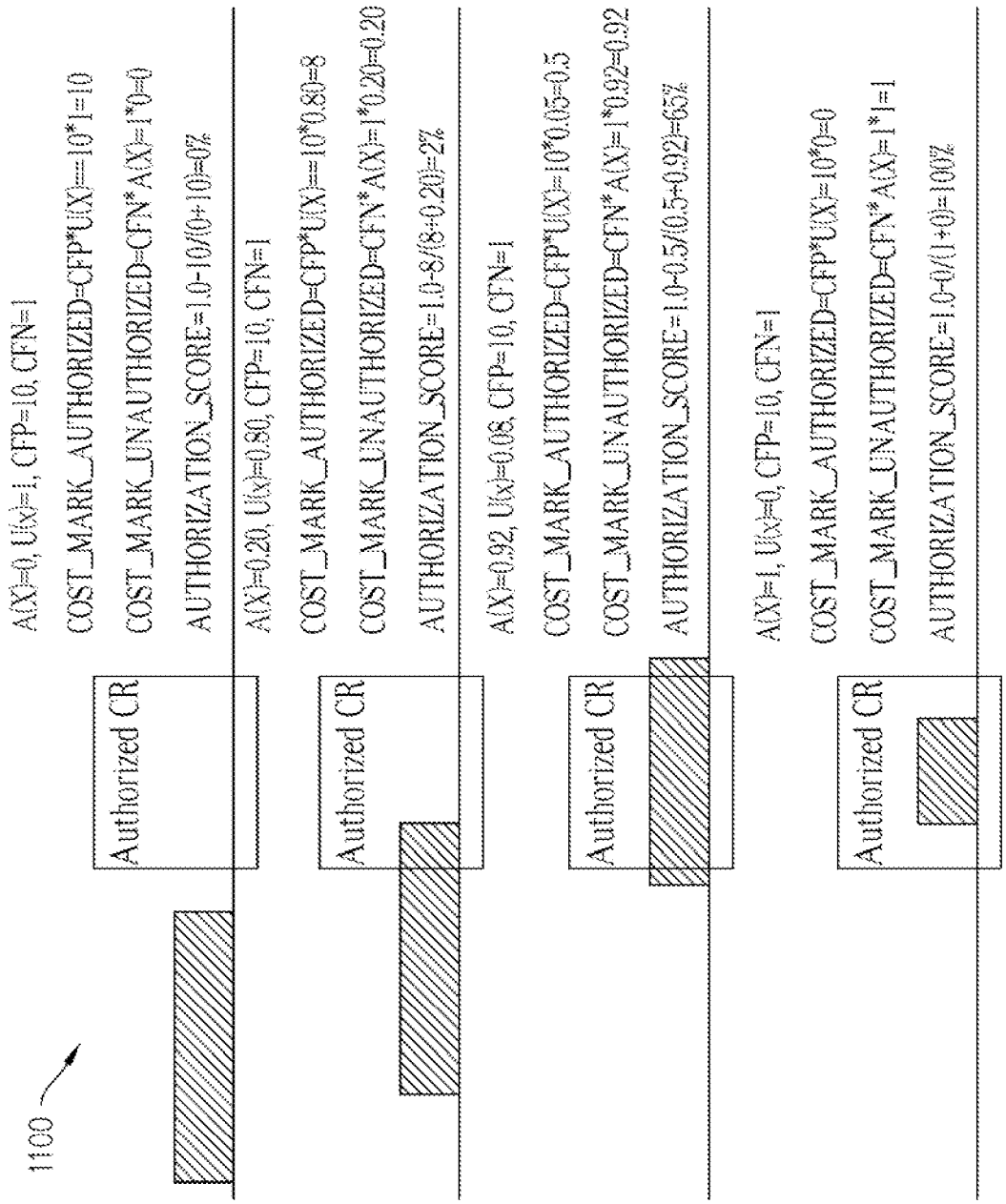
FIG. 11  An illustrative example of Authorization score calculation

SYSTEM AND METHOD FOR CHANGE RECONCILIATION IN INFORMATION TECHNOLOGY SYSTEMS

TECHNICAL FIELD

The present disclosure relates generally to monitoring parameter changes in information technology (IT) systems and more specifically to determining if a change in the information technology system is authorized.

BACKGROUND

In the past decade information technology (IT) systems have evolved and increased in complexity. In the past a company would use a single computer with a single operating system and small number of programs to supply the computational needs of the company. Nowadays enterprise companies may have hundreds and thousands of computers interconnected over a network. The company may use multiple servers and multiple databases to service hundreds and thousands of computers connected to them. Essentially each layer of the IT system has evolved and become more complex to control and manage. In some cases, multiple servers may be installed with identical software and load balancers may be used to regulate access to the servers.

To standardize the IT operations, organizations follow an Information Technology Infrastructure Library (ITIL) process specifying guidelines, procedures, and processes to manage the efficient providing of IT services with guaranteed quality. For example, changes to existing IT environments follow several-step processes: the changes are planned, reviewed, approved, implemented, and verified. This helps to improve the ability to avoid problems in IT system modifications and day-to-day operation and to reduce the mean time to resolution (MTTR) for handling problems that still occur in the IT systems. The prevention of problems and reduction of the MTTR can help to prevent economic damage to the organization.

Unfortunately, despite careful planning and processing, the dreaded unauthorized change still occurs. Unauthorized changes greatly impact environments that support the business applications. Since it is very difficult to identify these unknown changes, incidents usually last a lot longer, causing more outage time and adding more cost to the business. Hence proactive identification of unauthorized changes can help to prevent outages and avoid any violations in regulatory compliance.

SUMMARY

An aspect of an embodiment of the disclosure relates to a system and method of identifying and reconciling changes in an information technology system. The system includes a server that detects changes in configuration parameters received from station of the system. The system identifies changes that are clearly authorized or clearly unauthorized and handles them accordingly. For example not taking actions for authorized changes and blocking or reversing unauthorized changes.

Changes that are not clearly authorized or clearly unauthorized are defined as potentially authorized changes, since they may be authorized, but need further examination. The system compares a context of the change request records of the potentially authorized changes with the context of the actual change that was performed and determines an authorization score. If the score is above a threshold value the change is recognized as authorized otherwise the change is recognized as unauthorized.

The context includes information regarding the implementer of the change, the scope of the change and a time window for the change.

Changes that don't have a change request record may have one generated for them based on external information leading to occurrence of the change or other information.

There is thus provided according to an embodiment of the disclosure, a method of change reconciliation in an information technology system, comprising: Detecting changes in configuration parameters collected from stations of the information technology system and collecting or generating change request records for the detected changes;

Identifying unauthorized changes and authorized changes based on given rules;

For a potentially authorized change that is not clearly authorized or unauthorized:

Identifying a context for the change request records, comprising:
  a) Identifying authorized change implementers;
  b) Identifying a scope of the content that is to be changed:
  c) Identifying a time window when the change is allowed to be performed;

Identifying a context for the actual change, comprising:
  a) Identifying a change implementer;
  b) Identifying a scope of the content that was changed;
  c) Identifying a time window when the change was performed:

Comparing the context of the change request with the context of the actual change;

Determining an authorization score responsive to said comparing;

Outputting the change authorization score.

In an embodiment of the disclosure, the generating is performed if a change request record does not exist and the change request record can be generated based on external knowledge of expected changes. Optionally, the clearly authorized changes include changes that conform to one of the following cases:
  a. changes that were preapproved in response to a request from a user;
  b. changes that were approved by a system rule;
  c. changes that were approved by a manifest that provides an exact list of the changes that are to be performed; and
  d. changes that were approved manually by performing a change and authorizing it by an authorization application.

In an embodiment of the disclosure, the clearly unauthorized changes include changes that conform to one of the following cases:
  a. changes that fit a rule in a blacklist of the system; and
  b. changes that are marked as unauthorized by an authorized user.

Optionally, the potentially authorized changes are based on artificial intelligence and include changes that conform to one of the following cases:
  a. changes that are similar to other authorized changes;
  b. changes on a station that are similar to authorized changes on other stations;
  c. changes that are performed automatically on a station by an operating system or authorized application; and
  d. changes that requested authorization but were performed while the authorization request was still pending.

In an embodiment of the disclosure, the potentially authorized changes are based on a change manifest and include changes that conform to one of the following cases:

a. changes that appear in the manifest but were only partially performed;

b. changes that were performed together with changes that appear in the manifest; and c. changes that appear in the manifest but their value is not as expected.

Optionally, the change implementer is identified by appearing as a field in a change request record, by appearing in text of a change request or determined based on patterns of previous changes implemented in a specific environment.

In an embodiment of the disclosure, the change scope is identified by appearing as a field in a change request record, by appearing in text of a change request or determined based on patterns of previous changes implemented in a specific environment.

Optionally, the change time window is identified by appearing as a field in a change request record, by appearing in text of a change request or determined based on patterns of previous changes implemented in a specific environment.

In an embodiment of the disclosure, the authorization score is based on a tradeoff between the cost of erroneously marking a change as authorized instead of unauthorized and the cost of erroneously marking a change as unauthorized instead of authorized.

There is further provided according to an embodiment of the disclosure, a system for change reconciliation in an information technology system, comprising:

A server in an information technology system network that is programed to perform the following process:

Detecting changes in configuration parameters collected from stations of the information technology system and collecting or generating change request records for the detected changes;

Identifying unauthorized changes and authorized changes based on given rules;

for a potentially authorized change that is not clearly authorized or unauthorized:

identifying a context for the change request records, comprising:

a) Identifying authorized change implementers;
b) identifying a scope of the content that is to be changed;
c) Identifying a time window when the change is allowed to be performed;

Identifying a context for the actual change, comprising:

a) Identifying a change implementer;
b) Identifying a scope of the content that was changed;
c) Identifying a time window when the change was performed;

Comparing the context of the change request with the context of the actual change;

Determining an authorization score responsive to said comparing;

Outputting the change authorization score.

There is further provided a non-transitory computer readable medium comprising an executable program code for implementing the method described above.

BRIEF DESCRIPTION OF THE DRAWINGS

The present disclosure will be understood and better appreciated from the following detailed description taken in conjunction with the drawings. Identical structures, elements or parts, which appear in more than one figure, are generally labeled with the same or similar number in all the figures in which they appear, wherein:

FIG. 11 is a schematic illustration of authorization score calculation of a change request (CR), according to an embodiment of the disclosure.

DETAILED DESCRIPTION

Figure 1:
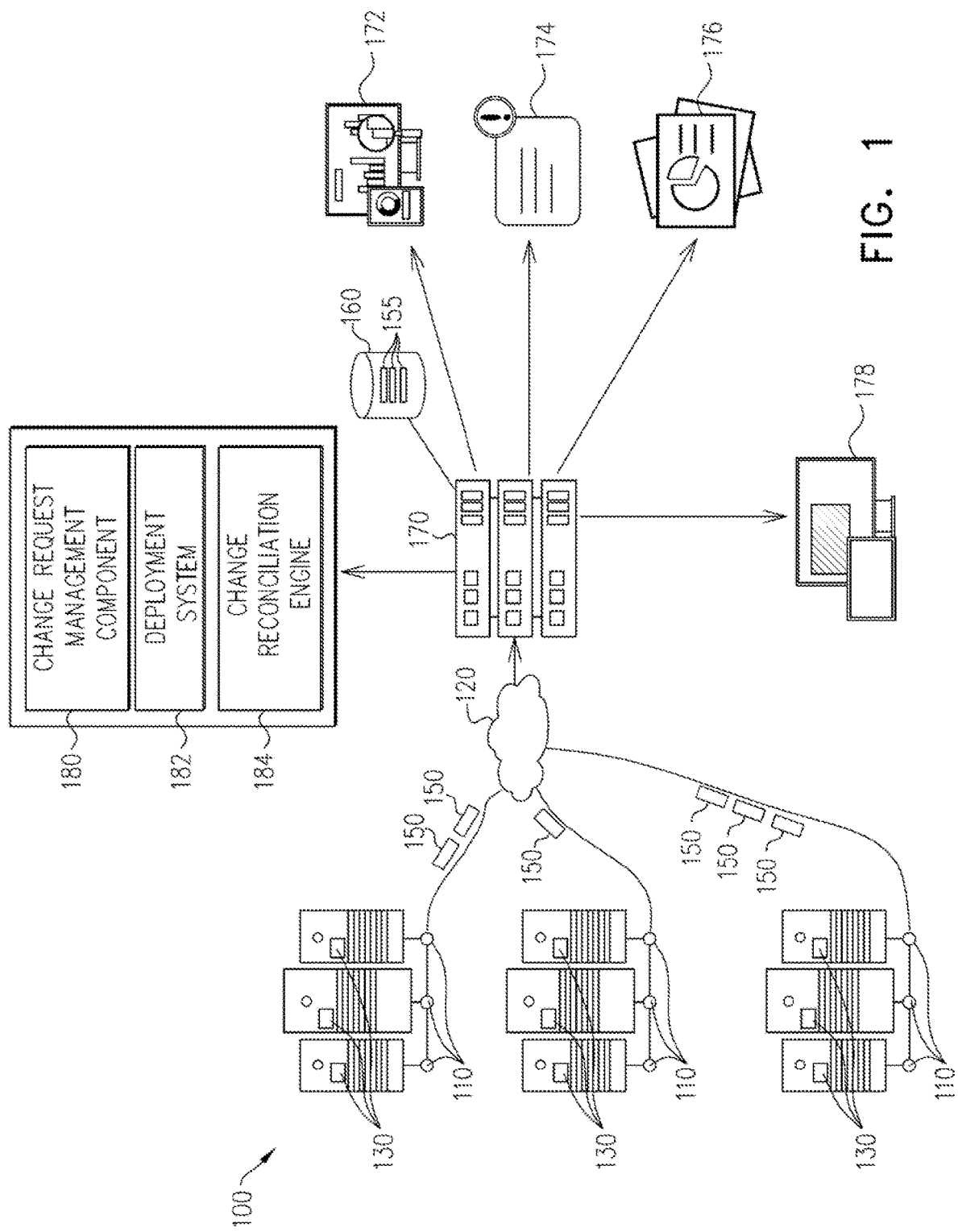
FIG. 1 is a schematic illustration of a network of computers connected in an information technology system, according to an embodiment of the disclosure.

FIG. 1 is a schematic illustration of a network of computers connected in an information technology system 100, according to an embodiment of the disclosure. In an embodiment of the disclosure, IT system 100 includes multiple stations 110 connected over a network 120. Optionally, each station 110 may serve as a workstation for accessing servers or may be a server for providing services to users of workstations or to other servers. Network 120 may be a local area network (LAN), a wide area network (WAN) (e.g. the Internet), a combination of both or any other type of network over which stations 110 may communicate. Optionally, each station 110 executes an agent application 130 for monitoring and collecting information at the station 110. The collected information includes configuration parameters 150 relating to the hardware and software installed in the stations 110 of IT system 100. Optionally, the configuration parameters 150 may be collected periodically and/or upon occurrence of a change to the configuration parameters 150. In some embodiments of the disclosure, the configuration parameters 150 may be only collected on specific stations 110, for example only on servers or only on specific servers that are important to IT system 100.

The stations 110 may be any type of general purpose computer including a processor and memory. Optionally, they may be standard desktop computers, dedicated server computers, rack mount computers, laptop computers, mobile devices or any other type of computing device. The stations 110 may be connected continuously or periodically to transfer the collected information.

In an embodiment of the disclosure, the information (e.g. configuration parameters 150) collected by agent application 130 is provide to an agent server 170 and stored in a database 160. Optionally, agent server 170 analyzes the collected information to detect changes 155 over time in the values of the configuration parameters 150. Alternatively, the agent application 130 may detect the changes 155 and only report changes 155, or report all configuration parameters 150 periodically in addition to reporting changes 155.

In an embodiment of the disclosure, each change 155 includes:

1. Location of the change in the IT environment (e.g. host, node, environment);
2. Configuration path:
3. Previous values;
4. Current value;
5. Who did the change?
6. When did the change occur (e.g. exact time or time range).

In some embodiments of the disclosure, instead of installing a dedicated agent application 130, the information is collected by standard API applications that are executed by the local operating system on the station 110 responsive to a request from agent server 170 or from other computer stations 110. Optionally, agent server 170 polls the stations 110 to extract the information and store it in database 160.

The configuration parameters 150 may include hardware details of the station 110, for example the amount of RAM, processor model, disk size, and models of devices attached. Optionally, the configuration parameters 150 may include firmware details, such as BIOS version, BIOS size and a checksum (e.g. CRC). Alternatively or additionally, the configuration parameters 150 may include details of application software installed on the station 110, including metadata (e.g. when installed and by whom) and application data. Additionally, the configuration parameters may include cloud resources, such as virtual machine, virtual storage device, virtual network device, virtual subnet, and similar items.

The applications may include operating systems, client server applications, database applications, or corporate applications used by a corporation to support the corporate activity, for example the applications may include SQL servers and web servers.

In an embodiment of the disclosure, configuration parameters 150 may include: application identity, application version, date of installation, name of the user that installed the application, updates installed, drivers installed, names and sizes of files belonging to each application, values of controllable parameters for configuring applications, file sizes, file checksums, registry content, available RAM, available disk space and any other information for identifying the status or affect of the software installed on the stations 110. Optionally, the number of recorded parameters dealt with by IT system 100 may be between 100 to 1000, 1,000 to 10,000, 10,000 to 100,000, 100,000 to 1,000,000 or more.

In some embodiments of the disclosure, agent application 130 may be installed on one or more stations 110 that are not connected together over network 120, for example at different organizations/clients. Optionally, the information may be stored locally and collected for example using an external disk, diskonkey or by temporarily connecting the station to a wide area network such as the Internet and transmitting the information to server 170 or database 160.

In an embodiment of the disclosure, the server 170 is configured to present the information stored in the database 160 or at the server 170 in a variety of ways, for example:

1. As a rich browser based client 172 enabling remote users to browse information stored in database 160 and/or analyzed by server 170;
2. By providing alerts 174 to an administrator, e.g. to specific servers in the network or to mobile phones;
3. By providing reports, 176 for example in an hourly/daily/weekly report listing unauthorized changes or changes that need to be checked; and
4. Other ways, for example by exporting 178 the information to other stations 110.

In an embodiment of the disclosure, before performing a change, the change should be requested and authorized by an administrator to prevent the change from being suspected to be a malicious change and/or to prevent spending time trying to identify if the change is acceptable or not. Optionally, server 170 includes a change request management component 180 such as "ServiceNow" or a similar product. The change request management component 180 enables a user to request performing changes to configuration parameters 150 so that the changes will be recognized by the IT system 100 and recognized as authorized changes. The change request management component 180 will generally follow the requirements of ITIL to control the lifecycle of the changes.

Alternately or in addition, server 170 may include a deployment system 182, for example, Jenkins, GitLab CI/CD or others. The deployment system 182 propagates a set of changes with a deployment pipeline mechanism to a selected set of environments (such as operating system, database, application server, message bus) and environment stage such as development (DEV) environment, test (TEST) environment, quality assurance (QA) environment, user-acceptance (UA) environment, production (PROD) environment, disaster recovery (DR) environment or similar. The environment can be hosted on physical servers, virtual machines or can be composed of cloud resources. If deployment system 182 is available, the deployment records are collected at server 170.

In an embodiment of the disclosure, each change request record, deployment record or other type of record (e.g. either manually entered, entered via change request management component 180 or deployment system 182) may include the following information:

1. A start time of the change implementation;
2. An end time of the change implementation;
3. A target environment, e.g. which type of stations/applications will perform the change;
4. A scope of the change, e.g. what parameters or elements will be changed and on which stations 110 of the environment;
5. The identity of who is authorized/unauthorized to make the change;

In an embodiment of the disclosure, the change request record (or deployment record) may be provided in the form of semi-structured or unstructured data, that is, data that is not in a pre-defined data model or is not organized in a pre-defined manner, for example, text description in natural language, log output, etc. It may contain data such as dates, numbers, facts, names of environments, names of configurations and their values, and similar information. Alternatively, the change request record may be semi-structured, that is, some fields might be available in a pre-defined data schema, for example, environment, host, time scope etc.

In some embodiments of the disclosure, the change request record may include a change manifest. The change manifest is a structured file (in YAML, JSON or XML) following a pre-defined structure specifying:
1. Planned changes and/or
2. The target state of the environment, for example:
   a. That Java JRE must be of a specific version (e.g. 1.7.10);
   b. The path to the configuration parameters;
   c. The content of the Windows registry;
   d. the field size in a database table;
   e. a rule that checks if a parameter value matches a specified condition,
   e.g. the value=X;

Optionally, the manifest includes:
1. The environment scope—a definition of the environment, e.g., which stations 110/applications will participate.
2. Rules encoding the expected changes and/or target state of the environment, for example:
   a. Parameter value>x;
   b. Parameter value contains x;
   c. Parameter is not x;
   d. Parameter exists;
   e. Parameter does not exist.
3. A list of the expected changes, for example:
   a. Parameter a1 exists;
   b. Parameter a2 exists;
   c. Parameter a4=193;
   d. Parameter a5="127.0.0.1".
4. A list of people authorized to perform the change;
5. A time scope in which the performer is authorized to perform the change.

In some embodiments of the disclosure, the manifest may be prepared before performing the change, by executing the change in a test environment and recording the actual changes, or by receiving a manifest from the entity that prepared the change, or by receiving the manifest that was generated automatically by a continuous integration/continuous deployment (CI/CD) pipeline, or by receiving the manifest from an external tool such as Puppet, Chef, Ansible.

Figure 2:
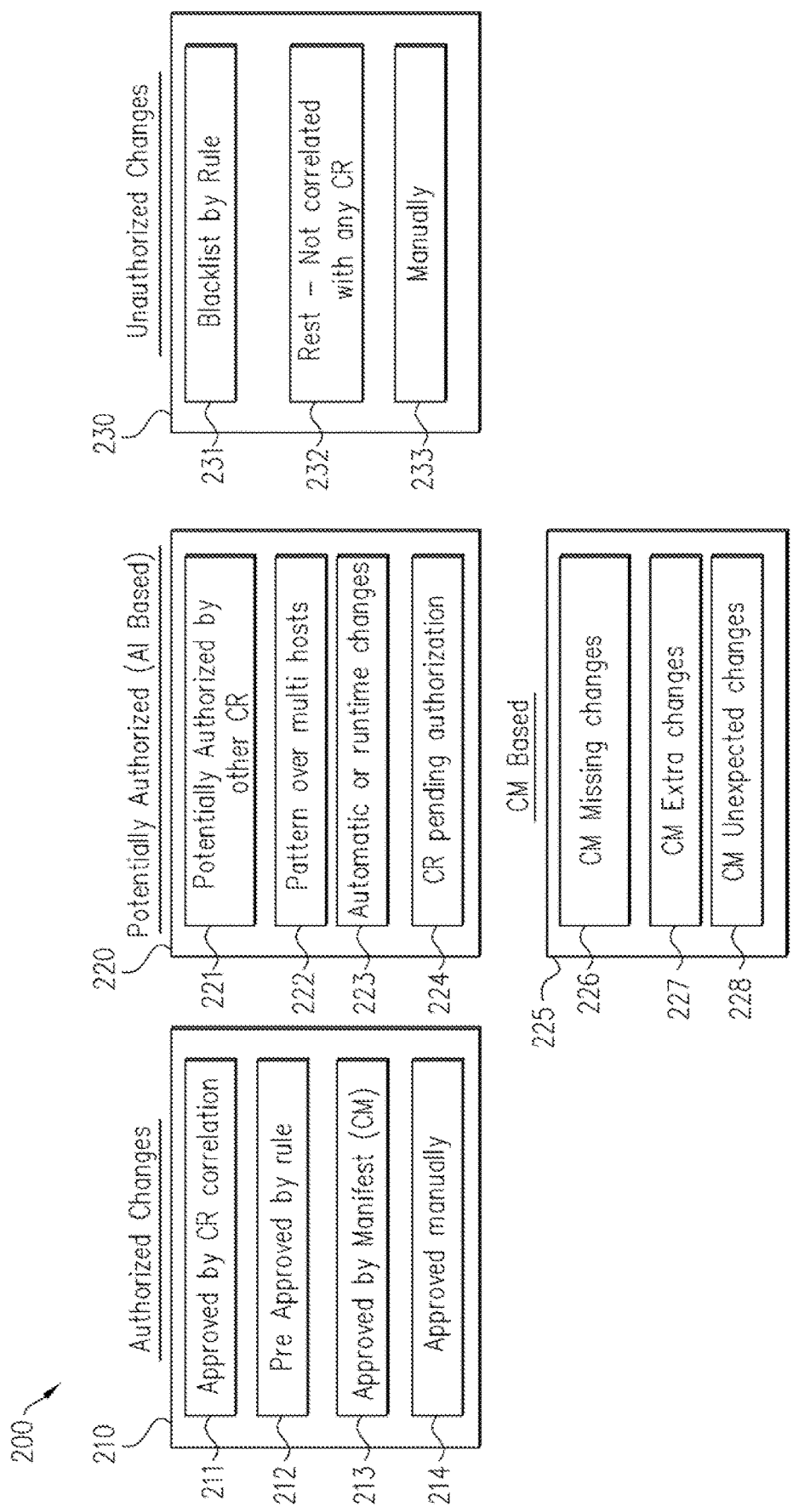
FIG. 2 is a schematic illustration of reconciliation output categories, according to an embodiment of the disclosure.

In an embodiment of the disclosure, server 170 includes a change reconciliation engine 184 that analyzes the detected changes 155 and categorizes the changes into three main categories. FIG. 2 is a schematic illustration of reconciliation output categories 200, according to an embodiment of the disclosure. Optionally, the categories include:
1. Authorized changes 210;
2. Unauthorized changes 230; and
3. Potentially authorized changes, which may include AI based 220 and change manifest based 225.

(1) authorized changes 210 may include:
1. Changes 155 that were approved by a change request correlation 211, for example a user requested to install a specific program and the request was authorized;
2. Changes 155 that were approved by a rule 212, for example that a station's operating system is updated once a month on a specific date;
3. Changes 155 that were approved by a manifest 213 that provides an exact list of the changes that are to be performed.
4. Changes 155 that were approved manually 214, for example, by logging into application, selecting a change and marking it as authorized.

(II) Potentially authorized changes may include:
AI based changes 220, for example:

1. Potentially authorized by other change requests 221, for example, when there is an application update installed on a server A but no change request exists, so this would have been an unauthorized change; however, there is a change request authorizing the same application update on other servers B, C, and D. Hence the application update on server A is marked as potentially authorized as there is high likelihood that this change was allowed.
2. Pattern over multi hosts 222, for example, when there is an application update installed on server A but no change request exists, so this would have been an unauthorized change; however, there are several other servers B, C and D where the application update was also installed and there is no change request either; moreover, historical analysis of the application updates installed on servers A, B, C, D shows they are installed periodically, hence the application update change on server A is marked as potentially authorized due to a pattern over multiple hosts.
3. Automatic or runtime changes 223, for example, an operating system automatically starts and stops certain services, changes services AutoStart configurations, dynamically changes allocated Page-File size etc. Since such runtime changes are caused by normal system operational cycles, they can be treated as potentially authorized and eventually whitelisted.
4. Change requests pending authorization 224, for example, there is a change request ticket instructing installation of operating system patches on server A over the weekend; however, the ticket is pending authorization by a security team, which didn't review it in time. The operating system patches get installed over the weekend, but on the following Monday morning, the authorization by the security team is still not completed. The system correlates the installed patches to the change request, but since authorization is still pending, the changes cannot be marked as authorized, hence the system marks them as "pending authorization".

Change manifest (CM) based changes 225, for example:
1. Missing changes 226, —changes that appear in the manifest but were not performed; for example, a manifest specifies three operating system patches to be installed (KB100, KB101, KB102); however, when scanning a server for changes, only KB100 and KB101 are present. KB102 is then marked as a missing change.
2. Extra changes 227, —changes that were performed together with the changes from the manifest but do not appear in the manifest; for example, a manifest specifies three operating system patches to be installed; however, when scanning a server there are four changes—three operating system patches and an additional change modifying the firewall to allow TCP traffic on port 81. This additional changes is marked as an extra change.
3. Unexpected changes 228, —changes that appear in the manifest, but their value differs from the expected value, for example, a manifest specifies that a Connection-Pool-Size parameter in a database must be set to 20. However the parameter was changed to a value of 200.

(III) Unauthorized changes 230 may include:
1. Changes that fit a rule in a blacklist 231, for example, when there is a rule specifying that there must be no changes to a Tomcat webserver configuration during a change freeze period (e.g., Black Friday sales weekend). If any Tomcat configuration does get modified, such changes are marked as blacklisted.
2. Changes that don't fit any know change request 232, for example changes that did not file a request and do not match any pattern.

3. Manually performed changes 233, for example wherein a user of a specific station 110 makes a local change without permission.

Figure 3:
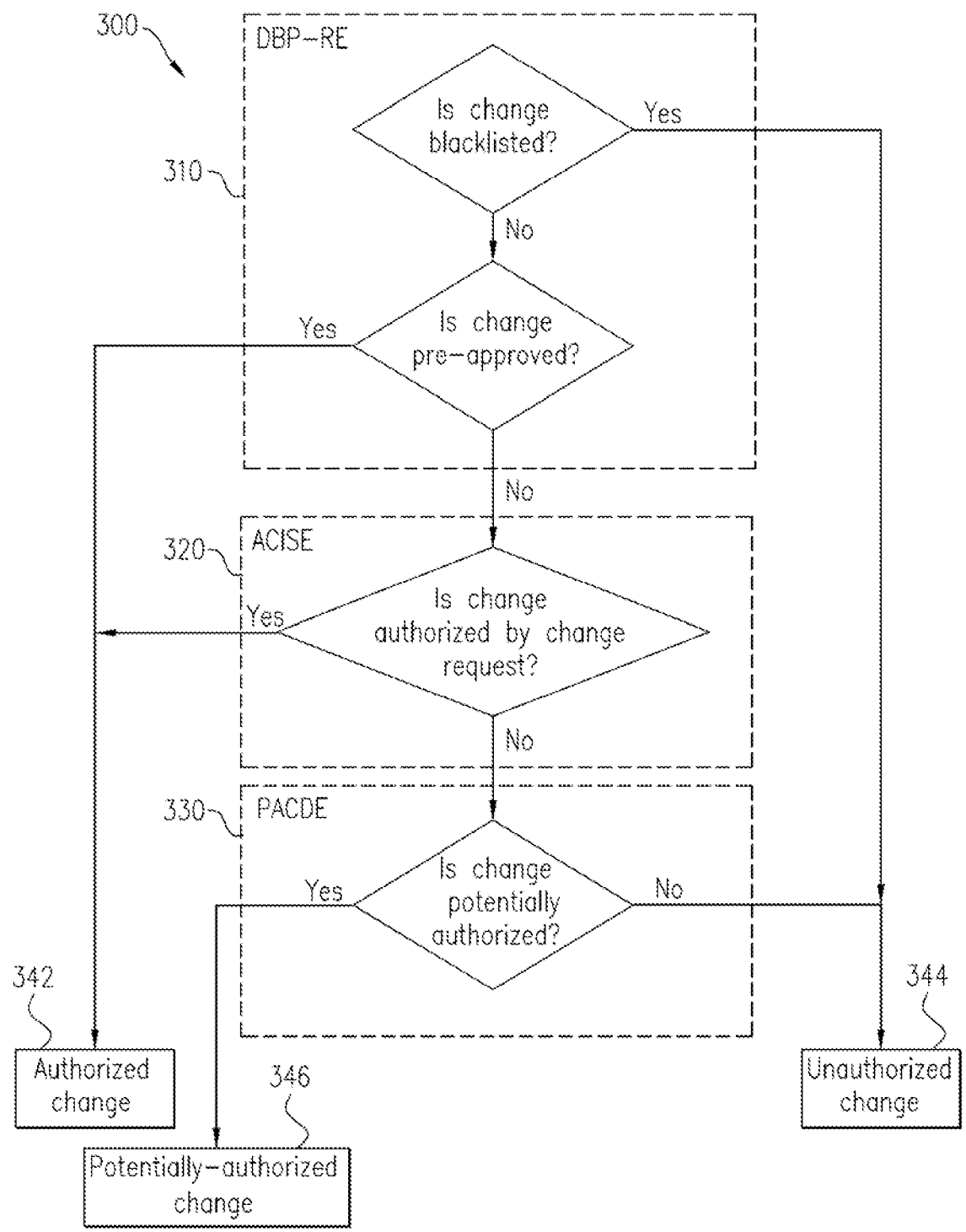
FIG. 3 is a flow diagram of a decision tree in a reconciliation engine, according to an embodiment of the disclosure.

FIG. 3 is a flow diagram of a decision tree in a reconciliation engine, according to an embodiment of the disclosure. Optionally, classification can be performed with a decision tree, such as decision tree 300 as shown in FIG. 3. In an embodiment of the disclosure, the decision tree includes three main parts that output one of the categories as depicted in FIG. 2 (authorized 210, potentially authorized 220, unauthorized 230). Optionally, the decision tree may further relate to sub categories (e.g. potentially authorized—artificial intelligence (AI) based 220 or change manifest (CM) based 225).

The main parts include:
1. Detection of blacklisted and pre-approved changes (DBP-R E) 310;
2. Authorized Change Identification and Scoring Engine (ACISE) 320;
3. Potentially authorized change detection engine (PACDE) 330.

In an embodiment of the disclosure, the rule engine for detection of blacklisted and pre-approved changes (DBP-RE) 310 comprises a database of policies in a form of rules including:
1. Reference to the environment;
2. Reference to the configuration;
3. Status: pre-approved/blacklisted;
4. A time frame during which the change is allowed to be performed;
5. A list of user's that are allowed to perform the change;
6. Rule priority.

Following is a procedure 310 for detection of blacklisted and pre-approved changes:
For each change:
   For each rule in (optionally prioritized list):
      Try to match the change against the rule
         If a match is detected and the rule is blacklisted, change is classified as Unauthorized 344 (optionally with an explanation of the matched rule)
         If a match if detected and the rule is whitelisted, the change is classified as Authorized 342 (optionally with an explanation of the matched rule)
      If a match is not identified, the change is sent to the next stage (320)

In the next stage the system then comprises an Authorized Change Identification and Scoring Engine (ACISE) 320 that estimates authorization status from three key aspects:
1. Who did the change and whether it corresponds to the person that was supposed to implement the change;
2. What changed and whether it corresponds to the approved change request scope and configuration item;
3. When it changed and whether it corresponds to the scheduled maintenance window.

Figure 4:
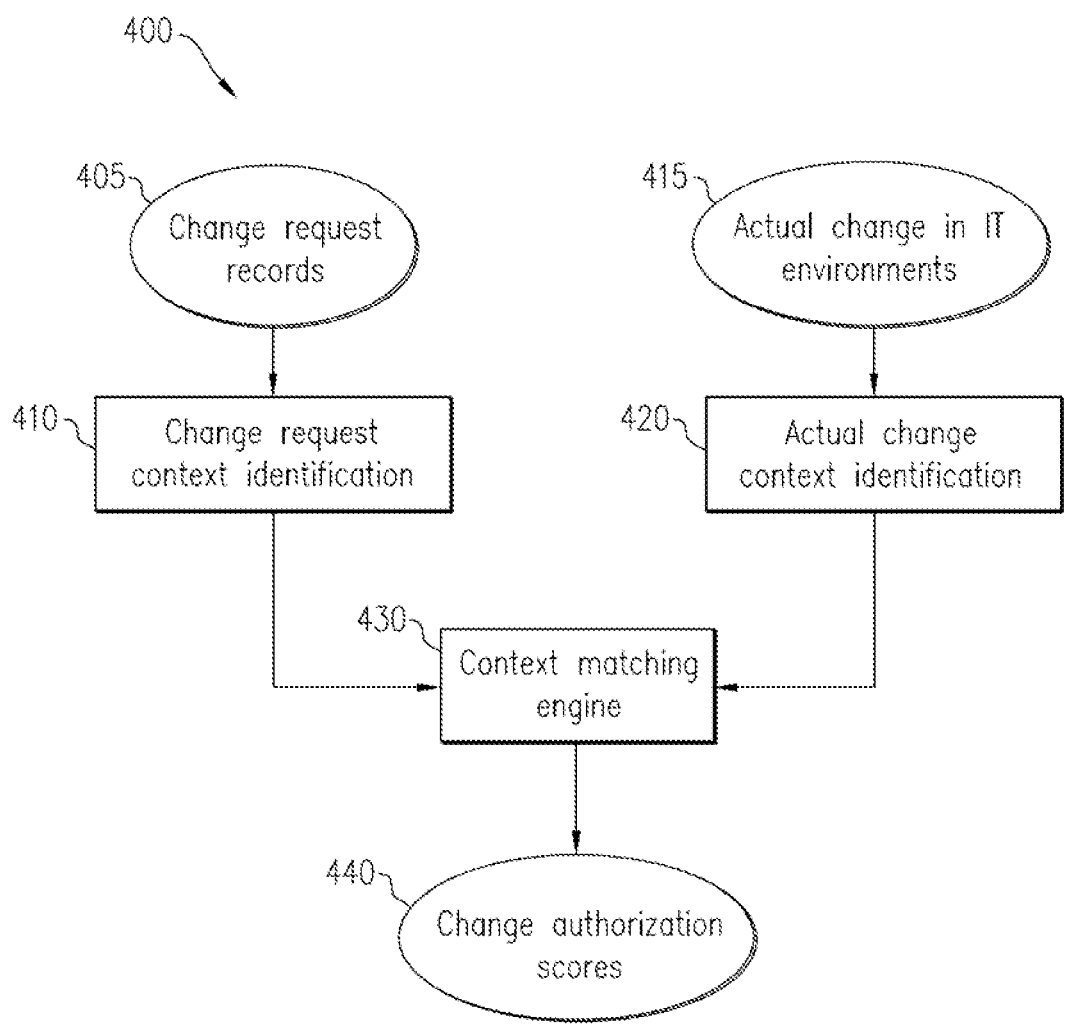
FIG. 4 is a flow diagram of a module of input to ACISE when change records are available, according to an embodiment of the disclosure.

FIG. 4 is a flow diagram of a module 400 of input to ACISE 320 when change request records are available 405, according to an embodiment of the disclosure.

The module 400 consists of three main parts as shown in FIG. 4:
1. Establishing a context of the change request 410 (change request ticket, deployment or similar);
2. Establishing the context of actual change 420 (actual change as collected by the system);
3. Calculating the match between the change request and the actual change context with a context matching engine 430.

The input to module 400 is the actual change request records 405 and the actual detected changes 415 in the system as shown in FIG. 4. The output from module 400 is a change authorization score 440 representing how accurate is the matching of an actual change 415 to a change request record 405.

Figure 5:
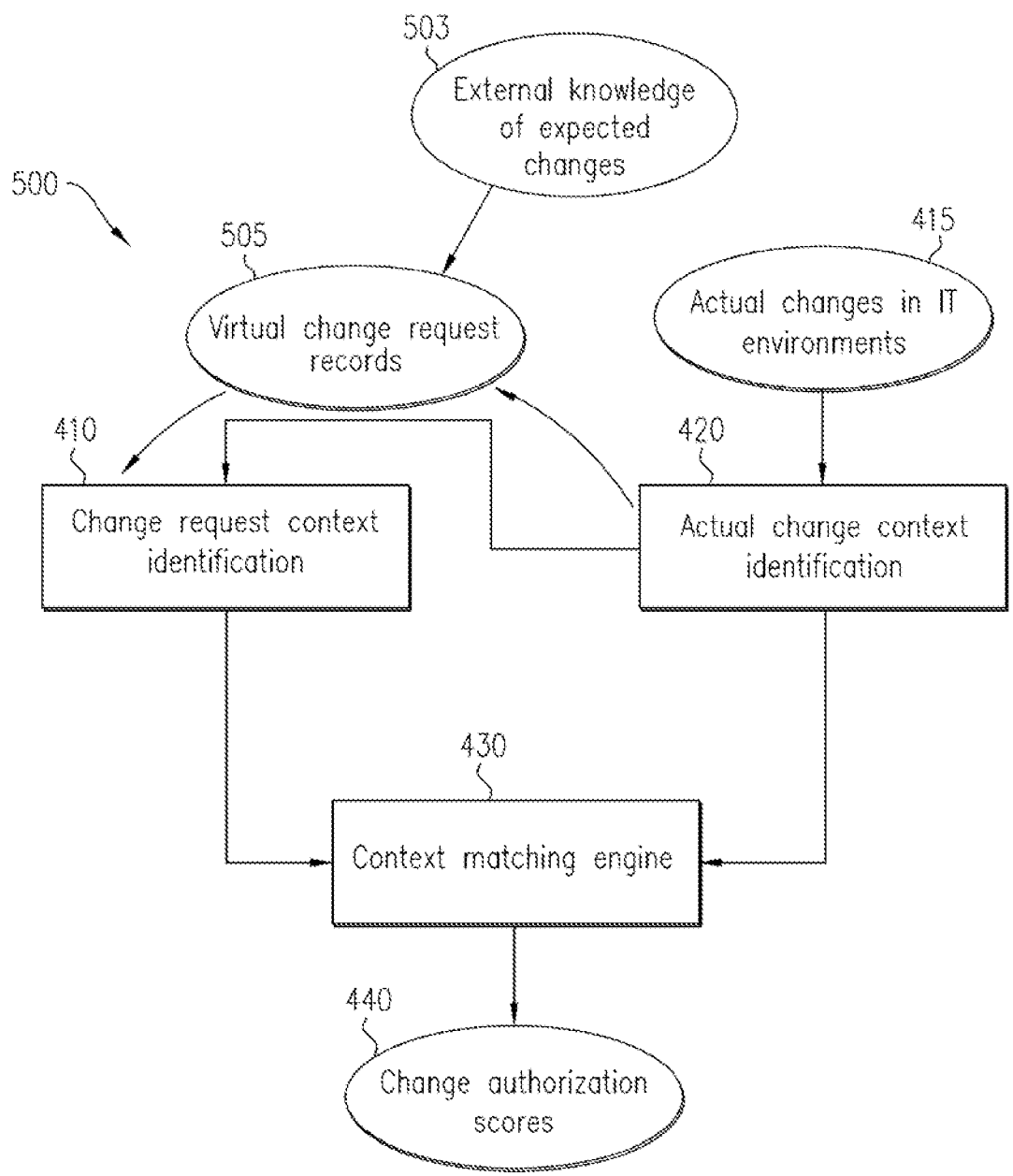
FIG. 5 is a flow diagram of a module of input to ACISE when change records are not available, according to an embodiment of the disclosure.

Following is a procedure for module 400:
For each change:
   Determine change context
   For each change request record:
      Determine change request context
      Calculate authorization score with context matching engine (CME)
      If authorization score exceeds the threshold, mark the change as authorized by change request record
      If there is not a change request record exceeding the authorization score, the change is sent to the next stage FIG. 5 is a flow diagram of a module 500 of input to ACISE 320 when change request records 405 are not available, according to an embodiment of the disclosure. Thus, if change request records 405 are not available, a virtual change record pattern identification system (VCR-PIS) creates a virtual change request record 505 for each change 155, for example based on external knowledge of expected changes 503. Virtual change request records 505 are then passed to change request context identification 410 as shown in FIG. 5. The process then continues as described for procedure 400.

As an example, Microsoft releases patches to the Windows operating system each first Tuesday in a month. In this case a virtual change request 505 is created authorizing installation of Windows patches. One procedure to create a virtual change request 505 is as follows: connect to an announcement data feed of a vendor for a particular product (e.g., Microsoft Windows, Microsoft Office, Oracle Database, . . . ) and track new release information. When an announcement about security patching, new version or an update is made, use the provided information to construct a virtual change request either by manually typing the information, automatically parsing the text or by listing a set of expected changes.

Alternatively or additionally, a virtual change request 505 might be constructed by analysing a set of changes in the environment. For example, a new Linux kernel release may cause five Ubuntu servers to be automatically updated and such a pattern can be automatically identified. In this case, the procedure to identify virtual change request 505 is based on hierarchical clustering of all detected changes as follows. For each change 155, a set of properties is calculated, for example, time of change, environment, configuration, etc. Each change is represented as a vector, while all changes form a matrix, where columns correspond to properties, row to changes. Next, a distance measure is defined by calculating how different two changes are from each other. The distance measure can be Euclidian, Manhattan, 1-norm, Cosine distance or other. Next, a distance matrix is calculated as a distance between any two rows in the change matrix. The distance matrix is than passed on to a clustering algorithm, for example, agglomerative hierarchical clustering, K-means clustering, DBSCAN or others to identify clusters. If stable clusters are identified, they are proposed as a virtual change request records 505.

In some cases the virtual change request record is generated based on actual changes in the IT environment 415 and actual change context identification 420, which are known to be allowable (e.g. by a rule). In such a case the change authorization score is expected to be 100, since the request is based on the results.

Once a virtual change request 505 is constructed, it can be used as input 405 to module 410 and processed as described in procedure 400.

Figure 6:
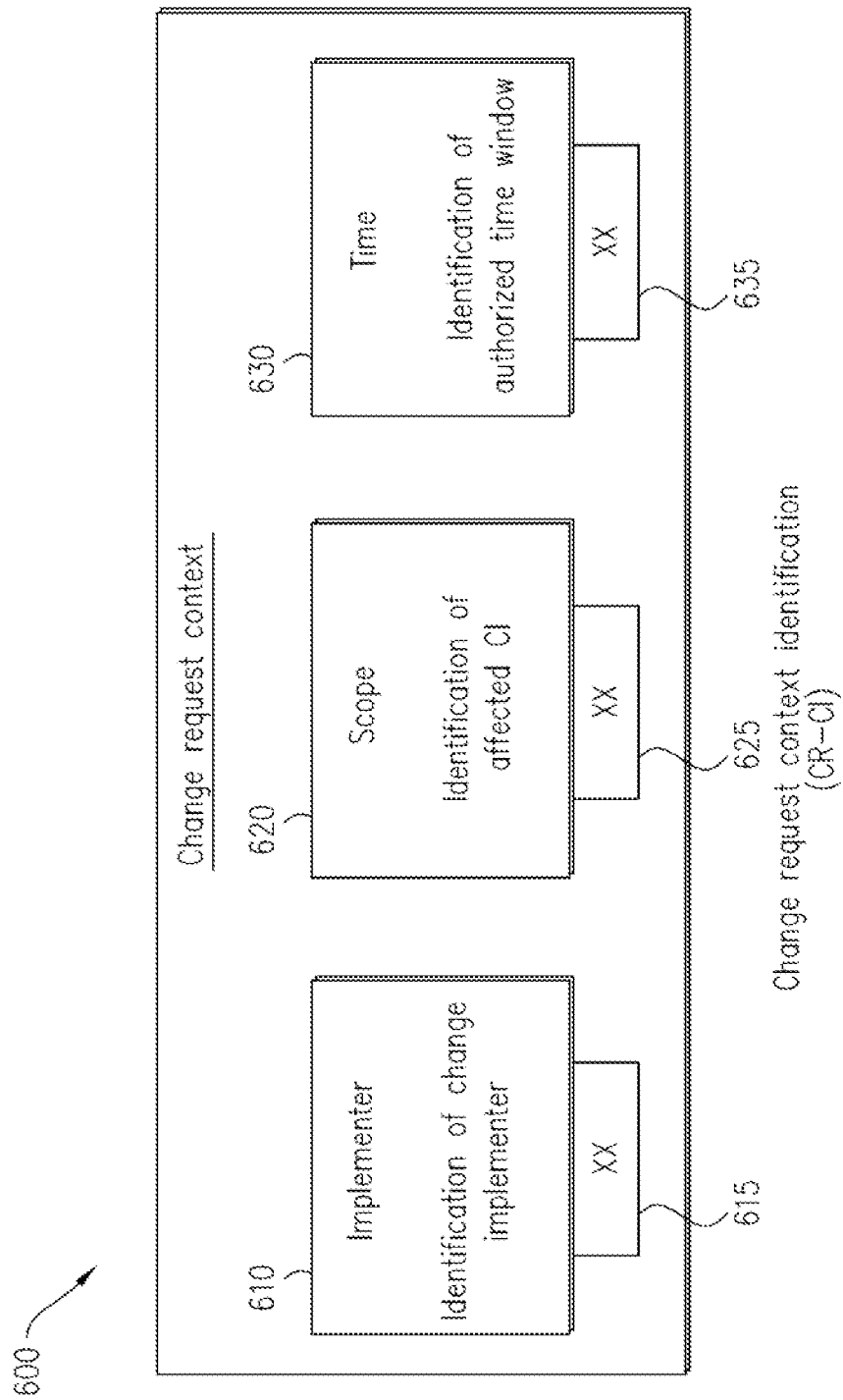
FIG. 6 is a block diagram of a change request context identification (CR-CI) module, according to an embodiment of the disclosure.

FIG. 6 proposes an implementation of change request context identification step 510 in procedure 500. It outlines a block diagram of a change request context identification (CR-CI) module 600, according to an embodiment of the disclosure. Optionally, the CR-CI module 600 has three components dedicated to calculating the following contextual properties:

1. Implementer 610—defining who should be implementing the change;
2. Scope 620—defining what the scope of the change is;
3. Time 630 defining when the change can be implemented.

Each property might have an additional attribute confidence (615, 625, 635) specifying how reliable the information is. Optionally, the confidence attribute (615, 625, 635) may range from a value of 0 meaning the data is unreliable to 100 meaning the data can be trusted.

Figure 7:
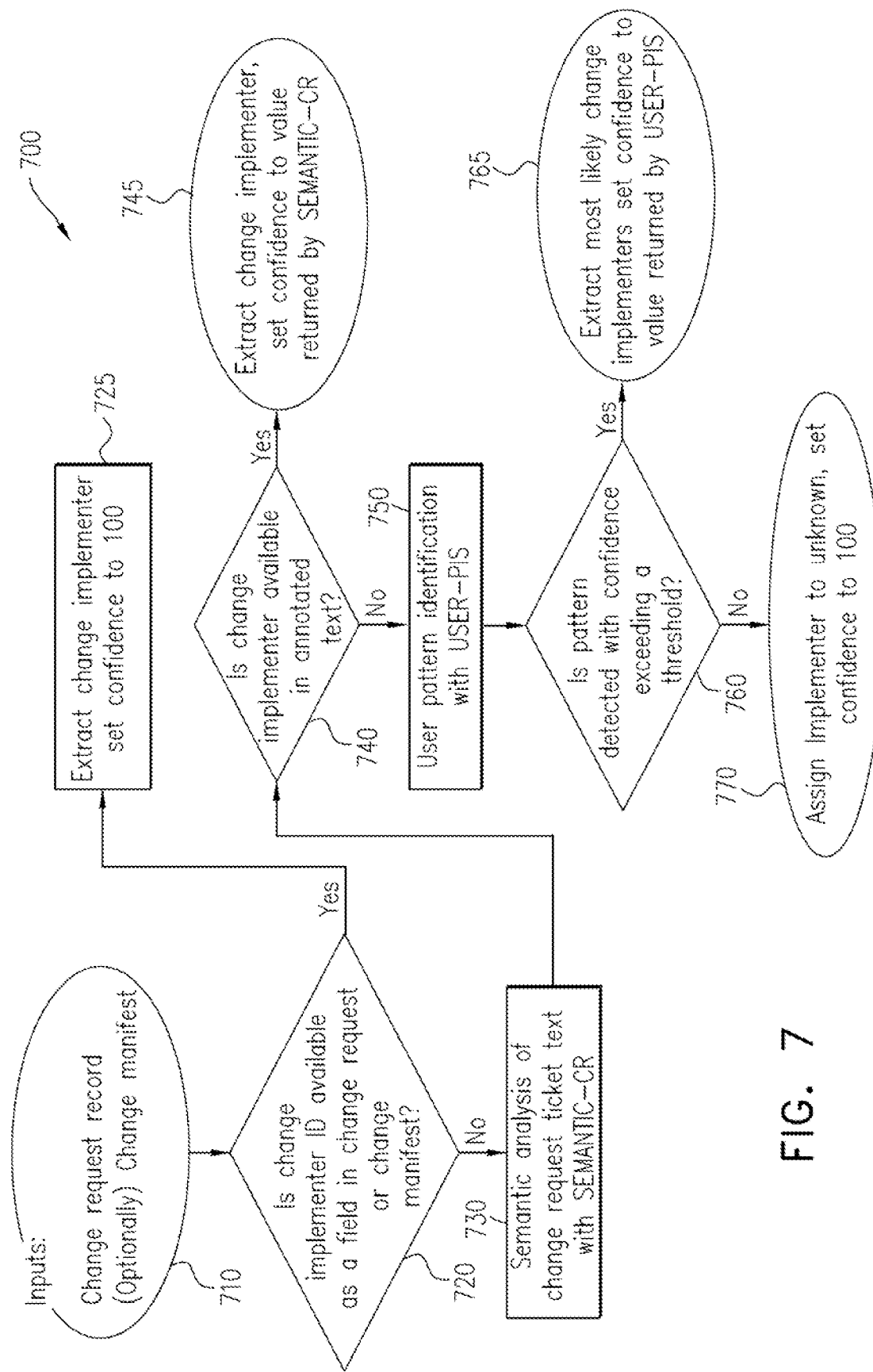
FIG. 7 is a flow diagram of a method of identifying a change implementer, according to an embodiment of the disclosure.

FIG. 7 is a flow diagram of a method 700 that proposes a possible implementation of component 610—identifying a change implementer, according to an embodiment of the disclosure.

Input 710 to the method 700 is a change request 405. The output is change implementer expressed as a person ID, for example, username, or first and last name, or email, or other user ID.

The first step 720 checks if a person is available in change request record 405 in a structured format, for example, does the change request list a change implementer in a particular field, or is there a change manifest attached to the change request specifying which person is implementing the change. If yes, the method output 725 is the identified person ID and the confidence is set to 100. If no, the processing continues with semantic analysis step 730, which uses method 1000 (FIG. 10) to identify any potential person annotation. The output of 1000 is checked in step 740: if method 1000 returns an entity representing a person, then step 740 obtains the persons ID. Output 745 returns the person ID and the confidence value as set by method 1000. If method 1000 doesn't return any entity representing a person, processing continues with step 750 implemented with User Pattern Identification System (USER-PIS) that looks for patterns. In an embodiment of the disclosure, USER-PIS might use several pattern mining algorithms to determine a person performing a change request (CR) and a confidence score of the determination, for example by analysing historical change requests and identifying who is the typical implementer for a particular environment, e.g., John Doe always implements installation of Windows updates. The output of USER-PIS is checked in step 760: if USER-PIS returns an entity representing a person, the process obtains a person ID and output 765 returns the person ID and the confidence value as set by method USER-PIS. If method USER-PIS doesn't return an entity representing a person, output 770 returns "unknown" person with confidence set to 100.

Figure 8:
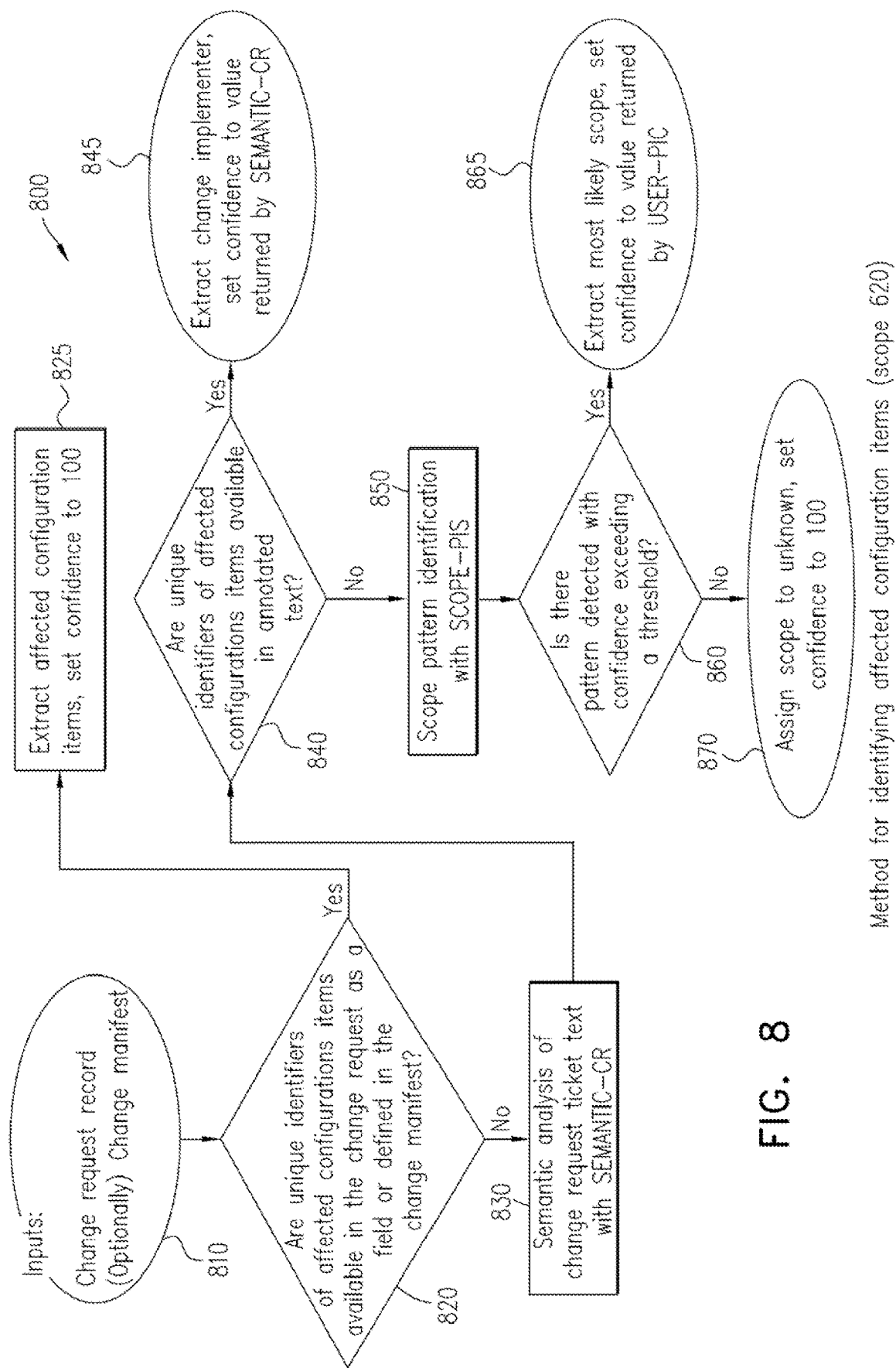
FIG. 8 is a flow diagram of a method of identifying affected configuration items (scope), according to an embodiment of the disclosure.

FIG. 8 is a flow diagram of a method 800 that proposes a possible implementation of identifying affected configuration items (scope) 620, according to an embodiment of the disclosure.

Input 810 to the method 800 is a change request 405. The output is scope 620, e.g., a list of expected changes or one or more rules specifying where changes are expected (e.g. windows patches without any particular number).

The first step 820 checks if unique identifiers of affected configuration items, for example, "windows patching", are available in change request records 405 in a structured format, for example, does the change request list expected changes in a particular field, or is there a change manifest attached to the change request listing expected changes. If yes, the method output 825 are the affected configuration items extracted as scope 620 and the confidence is set to 100. If no, the processing continues with semantic analysis step 830, which uses method 1000 to identify any potential identifiers. The output of 1000 is checked in step 840: if method 1000 returns any entities marked as configuration items, the method output 845 returns the list of identified configuration items as environment scope 620 and the confidence value as set by method 1000. If method 100 doesn't return any entities marked as configuration items, the processing continues with step 850 implemented with Scope Pattern Identification System (SCOPE-PIS) that looks for patterns, for example, by analysing historical change requests and implemented changes to identify what are the typical changes, e.g., server patching always produces changes with the message "Windows KBxxxx installed". In an embodiment of the disclosure, SCOPE-PIS might use several pattern mining algorithms to determine a potential scope of a change request (CR) and a confidence score of the determination.

The output of SCOPE-PIS is checked in step 860: if the method SCOPE-PIS returns any entities marked as configuration items, the step constructs the list of identified configuration items and output 865 returns the list of identified configuration items as environment scope and the confidence value as set by method SCOPE-PIS. If method SCOPE-PIS doesn't return any entities marked as configuration items, the output 870 returns "unknown" environment scope with confidence set to 100.

Figure 9:
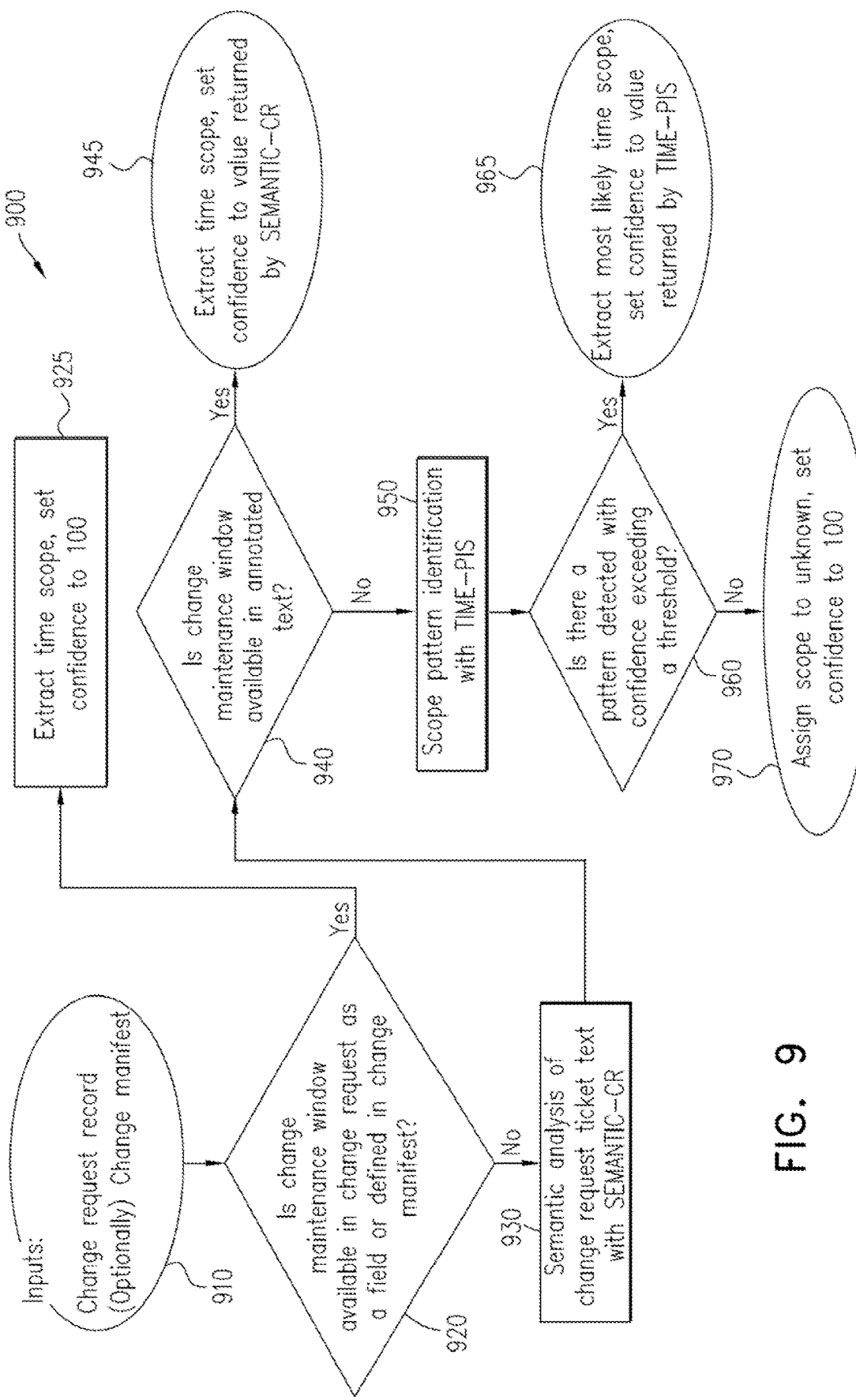
FIG. 9 is a flow diagram of a method of identifying authorized change maintenance time window, according to an embodiment of the disclosure.

FIG. 9 is a flow diagram of a method 900 of identifying authorized change maintenance time window that proposes an implementation of the component 630, according to an embodiment of the disclosure.

Input 910 to the method 900 is a change request record 405. The output is a time scope also known as maintenance window, e.g., a range time expressed with "start" and "end" date and time specifying when the changes are expected (e.g. between 17.10.2020 15:20:00 GTM and 17.10.2020 17:35:00 GTM).

The first step 920 checks if a maintenance window is available in change request record 405 in a structured format, for example, does the change request list the maintenance window in a particular field, or is there a change manifest attached to the change request 405, listing the expected time window. If yes, the method output 925 is the identified maintenance window and the confidence is set to 100. If no, the processing continues with semantic analysis step 930, which uses method 1000 to identify any potential time annotations. The output of 1000 is checked in step 940: if method 1000 returns any entities marked as time or time range, the step constructs the maintenance window and output 945 returns the expected time window and the confidence value as set by method 1000. If method 1000 doesn't return any entities marked as time or time range, the processing continues with step 950 implemented with Time Pattern Identification System (TIME-PIS) that looks for patterns. In an embodiment of the disclosure, Time Pattern Identification System (TIME-PIS) might use several pattern mining algorithms to determine a time interval for performing a change request (CR) and a confidence score of the determination, for example by analysing historical change requests to identify what is the typical maintenance window, which may be that Windows updates are typically installed on Tuesday night. The output of TIME-PIS is checked in step 960: if method TIM E-PIS returns any entities marked as time or time range, the step constructs the maintenance window and output 965 returns the expected time window and the confidence value as set by method TIME-PIS. If method TIME-PIS doesn't return any entities marked as time or time range, the output 970 returns "unknown" maintenance window with confidence set to 100.

Figure 10:
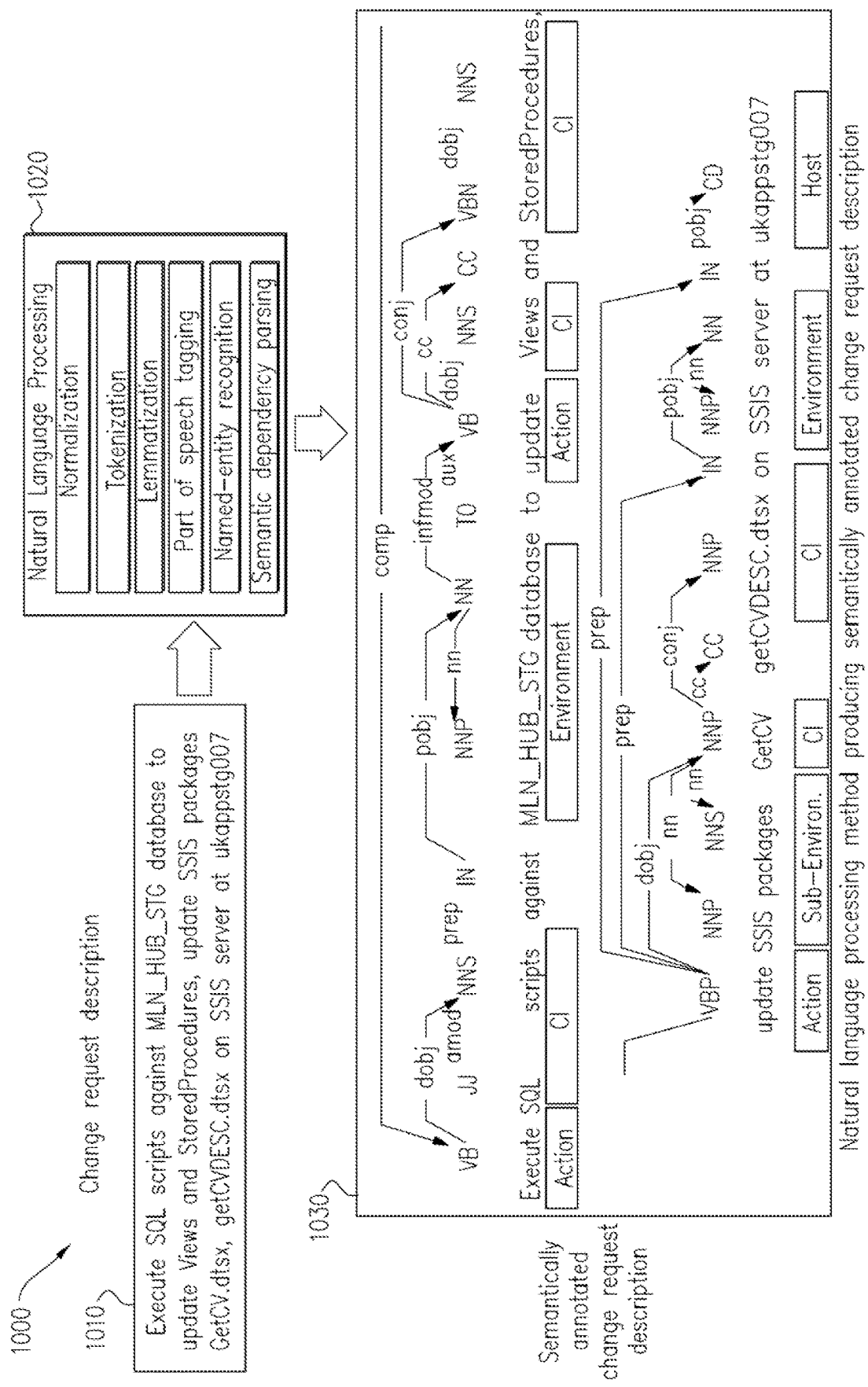
FIG. 10 is a block diagram of a semantic change request (SEMANTIC-CR) module that uses natural language processing methods to produce semantically annotated change request descriptions, according to an embodiment of the disclosure.

FIG. 10 is a block diagram of a semantic change request (SEMANTIC-CR) module 1000 that uses natural language processing methods to produce semantically annotated change request descriptions, according to an embodiment of the disclosure. In an embodiment of the disclosure, the SEMANTIC-CR module (e.g. in FIGS. 7, 8, 9) is used to perform a semantic analysis of a change request ticket. The analysis handles a title, a message, an attachment, or any other field available on the change request ticket. The output is an annotated text 1030, e.g., a list of triples <text, label, confidence level>, where annotation labels correspond to a set of pre-defined labels such as date, time, person, IT environment, configuration, cloud resource etc, and confidence corresponds to the likelihood that the assigned label is correct. Optionally, the analysis follows a machine-learning process for natural language processing (NLP), for example analysing a change request description 1010 with natural language processing options 1020 to produce a semantically annotated change request description 1030. Optionally, the language processing options 1020 may include:

1. Text normalization;
2. Tokenization;
3. Lemmatization;
4. Part of speech tagging;
5. Named entity recognition; and
6. Semantic dependency parsing.

Optionally, each step of the process might need a machine-learning model trained and calibrated on change requests tickets 405 from a specific language domain, for example, a corpus of texts containing terminology, terms and expressions used in IT. In addition, the SEMANTIC-CR module might need to be supplemented with a list for a named-entity recognition step, for example, a list of host names, a list of environments, a list of configurations, etc. The complete NLP process itself may be implemented by known tools such as NLTK Toolking, SpaCY, PyTorch-NLP, OpenNLP, StanfordNLP or similar tools. In addition, the NLP process might annotate text with part-of-speech tags for each word such as noun, verb or adjective as show in FIG. 10. In addition, the NLP process might provide semantic analysis of text that annotates role of words and relationship between words in sentence, for example, subject, proposition, etc.

In an embodiment of the disclosure, an Actual Change Context Identification (AC-CI) module is proposed as a possible implementation of module 420 in procedure 400. AC-CI is used to analyse the actual changes in the IT system 100 to extract the change implementer, affected configuration item, and time when the change was applied and corresponding confidence attributes. Some information is readily available through a collection phase, for example:

Time of change is defined either:
1. As an interval between time of the latest and previous scan (i.e. the change happened somewhere within that interval);
2. As a last modified timestamp (if CI has this property);
3. Provided by a third party tool (e.g. API interface or similar).

The confidence attribute is defined as a likelihood that a change happened within a specific time range.

Affected configuration items are readily available by a collection agent. The confidence attribute is defined as a likelihood that item was actually changed, e.g., compared to a change being reported due collection error, error in processing etc.

In an embodiment of the disclosure, the change implementer may be obtained by one of the following approaches:
1. A known automated (deployment) tool that makes changes to an IT environment signalling modifications;
2. One of the currently logged-in user with rights to modify the particular change implementer (CI);
3. Provided by a third party tool (e.g. API interface or similar);
4. Some tool that tracks who changed what.

The confidence attribute is defined as a likelihood that change was implemented by a particular user.

In an embodiment of the disclosure, a context matching engine (CME) is proposed as a possible implementation of method 430 in procedure 400. Input to CME is the output of change request context module 410, which can be calculated with 600 (and further 700, 800, 900) and the actual change context 420, which can be implemented with AC-CI. The result of CME comparison is probabilistic taking into account the quality of the information, outputting a label and optionally probability representing likelihood the label is reliable.

There are multiple possible outcomes/results:
1. Change is authorized if all of the following rules hold
  a. Information of identified authorized change implementer from change request is reliable and information of actual identified change implementer from actual request is reliable and they do match
  b. Information of identified authorized change context identifier (CI) scope from change request is reliable and information of identified actual change context identifier (CI) scope from the actual change request is reliable and they do match
  c. Information of identified authorized change maintenance time window from change request is reliable and information of actual change time interval is reliable and they do match In an embodiment of the disclosure, a system administrator sets a threshold when information is regarded as reliable. The threshold might be a set of each context property separately.

In some embodiments of the disclosure, the context matching engine (CME) calculates a score taking into account the procedure for calculating cost of the decision.

Let's assume the following:
The change is generated by an authorized process with probability $A(x)$
The change is generated by an unauthorized process with probability $U(x)=1-A(x)$
The expected cost of marking change as authorized
 $COST\_MARK\_AUTHORIZED = C_{TP}*A(X) + C_{FP}*U(X)$
  $C_{TP}$—Cost of marking authorized change as authorized;
  $A(X)$—probability that it was generated by an authorized process;
  $C_{FP}$—Cost of marking unauthorized change as authorized;

U(X)—probability that it was generated by an unauthorized process;

When $C_{TP}=0$:

COST_MARK_AUTHORIZED=$C_{FP}$*U(X)

Expected cost of marking change as unauthorized

COST_MARK_AUTHORIZED=$C_{FN}$*A(X)+$C_{TN}$*U(X)

$C_{FN}$—Cost of marking authorized change as unauthorized;

A(X)—probability that it was generated by an authorized process;

$C_{TN}$—Cost of marking unauthorized change as unauthorized;

U(X)—Probability that it was generated by an unauthorized process;

When $C_{TP}=0$:

COST_MARK_UNAUTHORIZED=$C_{FN}$*A(X)

Costs of making a mistake or correctly reconciling a change is defined by a system administrator.

How to Calculate U(x) and A(x)?

A(x)=likelihood that change x was generated by an authorized process.

A(x) can be calculated as a function, e.g., product, over confidence attributes (615, 625, 635) and confidence attributes returned by AC-CI module. Alternatively, A(x) can be calculated from the analysis of historical changes by analyzing the proportion of authorized changes compared to all changes in a particular environment. Alternatively, A(x) can be set manually by an expert to represent a likelihood that a random implemented change in IT system is authorized. Alternately, A(x) can combine all the approaches to estimate A(X).

The costs $C_{TP}$ and $C_{FP}$ can be set manually in a certain appropriate ratio by a domain expert, for example, $C_{TP}$:$C_{FP}$=1:100, $C_{TP}$:$C_{FP}$=0:10, etc. Alternatively, costs can be set according the costs associated with a business objective, e.g., cost associated with compliance divergence, costs associated with resolution efforts, costs associated with application downtime, etc.

How to Define an Authorization Score?

Authorization score=conviction that we picked the right authorization state

It is calculated as cost ratio:

AUTHORIZATION SCORE=1.0−COST_MARK_AUTHORIZED/(COST_MARK_AUTHORIZED+COST_MARK_UNAUTHORIZED)

FIG. 11 is a schematic illustration of an authorization score calculation 1100 of a change request (CR), according to an embodiment of the disclosure.

In an embodiment of the disclosure, the potentially authorized change detection engine (PACDE) 330 comprises several sub-routines mining for different patterns:

1. Actual change context identifier (CI) scope matches another Change request scope;

2. Actual change context identifier (CI) maintenance window matches another change maintenance window;

3. Pattern over multiple hosts;

4. Partial context match;

Information of identified authorized change implementer from change request is reliable and information of actual identified change implementer from actual request is reliable and they do not match Information of identified authorized change CI scope from change request is reliable and information of identified actual change CI scope from actual request is reliable and they do not match Information of identified authorized change maintenance window from change request is reliable and information of actual change time interval is reliable and they do not match In an embodiment of the disclosure, programs for performing change reconciliation are stored on a non-transitory computer readable medium, for example a DVD disk, a USB connectable disk or other medium, Optionally, the medium may be used to initialize a computing device to serve as agent server 170.

It should be appreciated that the above described methods and apparatus may be varied in many ways, including omitting or adding steps, changing the order of steps and the type of devices used. It should be appreciated that different features may be combined in different ways. In particular, not all the features shown above in a particular embodiment are necessary in every embodiment of the disclosure. Further combinations of the above features are also considered to be within the scope of some embodiments of the disclosure. It will also be appreciated by persons skilled in the art that the present disclosure is not limited to what has been particularly shown and described hereinabove.

The invention claimed is:

1. A method of change reconciliation in an information technology system, comprising:

detecting changes in configuration parameters collected from stations of the information technology system and collecting or generating change request records for the detected changes;

identifying unauthorized changes and authorized changes based on given rules;

for a potentially authorized change that is not clearly authorized or not clearly unauthorized:

identifying a context for the change request records, comprising:

a) identifying authorized change implementers:

b) identifying a scope of the content that is to be changed;

c} identifying a time window when the change is allowed to be performed;

identifying a context for the actual change, comprising:

d) identifying a change implementer;

e) identifying a scope of the content that was changed;

f) identifying a time window when the change was performed;

comparing the context of each change request with the context of the actual change;

determining an authorization score responsive to said comparing, wherein the authorization score is based on accuracy of a match between the authorized change implementers and the actual change implementer, the score of the content that is to be changed and the scope of the content that is changed and the time window when the change is allowed and the time window when the change is performance;

outputting the change authorization score.

2. The method of claim 1, wherein said generating is performed if a change request record does not exist and the change request record can be generated based an external knowledge of expected changes.

3. The method of claim 1, wherein said clearly authorized changes include changes that conform to one of the following cases:

g. changes that were preapproved in response to a request from a user;

h. changes that were approved by a system rule;

i. changes that were approved by a manifest that provides an exact list of the changes that are to be performed; and
j. changes that were approved manually by performing a change and authorizing it by an authorization application.

4. The method of claim 1, wherein said clearly unauthorized changes include changes that conform to one of the following cases:
k. changes that fit a rule in a blacklist of the system; and
l. changes that are marked as unauthorized by an authorized user.

5. The method of claim 1, wherein said potentially authorized changes are based on artificial intelligence and include changes that conform to one of the following cases:
m. changes that are similar to other authorized changes;
n. changes on a station that are similar to authorized changes on other stations;
o. changes that are performed automatically on a station by an operating system or authorized application; and
p. changes that requested authorization bat were performed while the authorization request was still pending.

6. The method of claim 1, wherein said potentially authorized changes are based on a change manifest and include changes that conform to one of the following cases:
q. changes that appear in the manifest but were only partially performed;
r. changes that were performed together with changes that appear in the manifest; and
s. changes that appear in the manifest but their value is not as expected.

7. The method of claim 1, wherein the change implementer is identified by appearing as a field in a change request record, by appearing in text of a change request or determined based on patterns of previous changes implemented in a specific environment.

8. The method of claim 1, wherein the change scope is identified by appearing as a field in a change request record, by appearing in text of a change request or determined based on patterns of previous changes implemented in a specific environment.

9. The method of claim 1, wherein the change time window is identified by appearing as a field in a change request record, by appearing in text of a change request or determined based on patterns of previous changes implemented in a specific environment.

10. The method of claim 1, wherein the authorization score is based on a tradeoff between the cast of erroneously marking a change as authorized instead of unauthorized and the cost of erroneously marking a change as unauthorized instead of authorized.

11. A system for change reconciliation in an information technology system, comprising:
a computer having a processor and memory configured to serve as a server in an information technology system network, wherein the computer is programed to perform the following process:
detecting changes in configuration parameters collected from stations of the information technology system and collecting or generating change request records for the detected changes;
identifying unauthorized changes and authorized changes based on given rules;
for a potentially authorized change that is not clearly authorized or not clearly unauthorized: identifying a context for the change request records, comprising:
a) identifying authorized change implementers;
b) identifying a scope of the content that is to be changed;
d) identifying a time window when the change is allowed to be performed;
identifying a context for the actual change, comprising:
d) identifying a change implementer; e) identifying a scape of the content that was changed;
f) identifying a time window when the change was performed:
comparing the context of each change request with the context of the actual change;
determining an authorization score responsive to said comparing: wherein the authorization score is based on accuracy of a match between the authorized change implementers and the actual change implementer, the scope of the content that is to be changed and the scope of the content that was changed and the time window when the change is allowed and the time window when the change was performed;
outputting the change authorization score.

12. The system of claim 11, wherein said generating is performed if a change request record does not exist and the change request record can be generated based on external knowledge of expected changes.

13. The system of claim 11, wherein said clearly authorized changes include changes that conform to one of the following cases:
g. changes that were preapproved in response to a request from a user;
h. changes that were approved by a system rule;
i. changes that were approved by a manifest that provides an exact list of the changes that are to be performed; and
j. changes that were approved manually by performing a change and authorizing it by an authorization application.

14. The system of claim 1, wherein said clearly unauthorized changes include changes that conform to one of the following cases:
k. changes that fit a rule in a blacklist of the system; and
l. changes that are marked as unauthorized by an authorized user.

15. The system of claim 11, wherein said potentially authorized changes are based an artificial intelligence and include changes that conform to one of the following cases:
m. changes that are similar to other authorized changes;
n. changes on a station that are similar to authorized changes on other stations;
o. changes that are performed automatically on a station by an operating system or authorized application; and
p. changes that requested authorization but were performed while the authorization request was still pending.

16. The system of claim 11, wherein said potentially authorized changes are based on a change manifest and include changes that conform to one of the following cases:
q. changes that appear in the manifest but were only partially performed;
r. changes that were performed together with changes that appear in the manifest; and
s. changes that appear in the manifest but their value is not as expected.

17. The system of claim 11, wherein the change implementer is identified by appearing as a field in a change request record, by appearing in the text of a change request or determined based on patterns of previous changes implemented in a specific environment.

18. The system of claim 11, wherein the change scope is identified by appearing as a field in a change request record, by appearing in text of a change request or determined based on patterns of previous changes implemented in a specific environment.

19. The system of claim 11, wherein the change time window is identified by appearing as a field in a change request record, by appearing in text of a change request or determined based on patterns of previous changes implemented in a specific environment.

20. A non-transitory computer readable medium comprising an executable program code for implementing the method of claim 1.

* * * * *